(12) United States Patent
Djerassem

(10) Patent No.: US 10,823,204 B2
(45) Date of Patent: Nov. 3, 2020

(54) PUMPING SYSTEM AND METHOD

(76) Inventor: Le Bemadjiel Djerassem, N'djamena (TD)

( * ) Notice: Subject to any disclaimer, the term of this patent is extended or adjusted under 35 U.S.C. 154(b) by 0 days.

(21) Appl. No.: 13/208,765

(22) Filed: Aug. 12, 2011

(65) Prior Publication Data

US 2011/0300004 A1    Dec. 8, 2011

Related U.S. Application Data

(63) Continuation-in-part of application No. PCT/OA2010/000001, filed on Jan. 19, 2010.

(30) Foreign Application Priority Data

Feb. 13, 2009  (OA) ............................... 1 2009 00059

(51) Int. Cl.
*F04F 1/12*     (2006.01)
*F03B 17/00*    (2006.01)
(Continued)

(52) U.S. Cl.
CPC .................. *F04F 1/12* (2013.01); *E03B 3/08* (2013.01); *F03B 17/005* (2013.01); *F04F 1/02* (2013.01);
(Continued)

(58) Field of Classification Search
CPC ........ F04F 1/02; F04F 1/06; F04F 1/08; F04F 1/10; F04F 1/12; F04F 3/00;
(Continued)

(56) References Cited

U.S. PATENT DOCUMENTS 50,893 A * 11/1865 Blackie .......................... 417/121
1,294,069 A * 2/1919 English .......................... 417/121
(Continued)

FOREIGN PATENT DOCUMENTS

DE   3716093 A1   1/1988
WO   9109224 A1   6/1991

OTHER PUBLICATIONS

Anonymous, "Perpetual Motion" Perpetual Motion: The History of an Obsession, St. Martins, Great Britian; Jan. 1, 1977; pp. 100-103.
(Continued)

*Primary Examiner* — Bryan M Lettman
*Assistant Examiner* — Charles W Nichols
(74) *Attorney, Agent, or Firm* — Kinney & Lange, P.A.

(57) ABSTRACT

A pump equipped with a plurality of systems includes a first system and a plurality of second systems, each of the plurality of systems containing an enclosed gas placed in contact with an internal liquid, it being possible for the enclosed gas to be placed at a depressed pressure or at a raised pressure in relation to the pressure of surroundings external to the system by variations in level of the liquid. The respective liquid environments of the plurality of systems are connected continuously so that compression or depression of the gas enclosed in the first system leads to successive variations in the levels of liquid in the second systems following successive applications of raised pressure or depressed pressure to the gases contained in the plurality of systems so as to allow the pumping of an external liquid in contact with the internal liquid of one of the systems.

4 Claims, 11 Drawing Sheets

(51) Int. Cl.
  *E03B 3/08* (2006.01)
  *F04F 1/02* (2006.01)
  *F04F 1/06* (2006.01)
  *F04F 1/08* (2006.01)

(52) U.S. Cl.
  CPC .............. *F04F 1/06* (2013.01); *F04F 1/08* (2013.01); *Y02E 60/16* (2013.01)

(58) Field of Classification Search
  CPC .......... F03B 17/005; E03B 3/08; Y02E 60/16; Y02E 60/17; Y02E 10/22; Y02E 10/28
  USPC ....... 417/118, 120, 121, 122, 123, 125, 137, 417/142, 144, 145
  See application file for complete search history.

(56) References Cited

U.S. PATENT DOCUMENTS

| | | | | |
|---|---|---|---|---|
| 1,390,085 A | * | 9/1921 | Salvatore | 417/121 |
| 1,628,943 A | * | 5/1927 | Wolcott | 417/121 |
| 2,131,183 A | * | 9/1938 | Key | 417/121 |
| 3,736,983 A | * | 6/1973 | Beard et al. | 166/313 |
| 3,829,246 A | * | 8/1974 | Hancock | 417/121 |
| 6,167,899 B1 | | 1/2001 | Chen | |
| 6,355,988 B1 | | 3/2002 | Maple | |
| 2005/0023836 A1 | | 2/2005 | Abdalla | |

OTHER PUBLICATIONS

International Search Report in foreign counterpart Application No. PCT/0A2010/000001, dated Sep. 2010.

* cited by examiner

PUMPING SYSTEM AND METHOD

CROSS-REFERENCE TO RELATED APPLICATION(S)

This application is a continuation-in-part (claiming benefit under 35 U.S.C. 120) of PCT Application No. PCT/OA2010/000001 filed Jan. 19, 2010 for "System and Method for the Autonomous Production of Fluid and Electricity" by Le Bemadjiel Djerassem, which in turn claims priority of African Intellectual Property Organization (OAPI) Application No. 1200900059 filed Feb. 13, 2009 for "System and Method for the Autonomous Production of Fluid and Electricity" by Le Bemadjiel Djerassem.

INCORPORATION BY REFERENCE

PCT Application No. PCT/OA2010/000001 noted above is hereby incorporated herein by reference in its entirety.

BACKGROUND

Prior Art

The various artificial methods of pumping that exist today all have one factor in common in that they require a constant source of energy—for example mechanical, electrical, solar, wind or hydrodynamic—in order to be able to transfer a liquid from one point to another. There are electrical pumps (submersible or axial ones with the electric motor at the surface) which, as the name implies, require electrical energy in order to be able to pump a liquid from one point to another. There are also man-powered piston pumps which are used for pumping water from bore-holes. These pumps require a constant input of manpower in order to operate. There are also pumps of the Glockeman type which also operate continuously but require a drop or natural source in order to be capable of operating autonomously.

Problems with the Prior Art

The prior art in terms of pumps has numerous problems associated with it. For example, the various known pumping systems require a constant supply of external energy because they need mechanical motion in order to supply the hydraulic energy required for displacing liquids. Also, they require energy supplies which are not always available near the site at which a pump is to be installed.

Another problem lies in the fact that the pumps are subject to mechanical component wear which means that the more the pumps are used, the more their service life is shortened. Such is particularly the case with hand pumps with which almost all village bore holes in the third world are fitted, which do not last very long because they wear out quite quickly.

Another problem lies in the fact that the best of these pumps has difficulty in reaching depths of 100 m, making these pumps impractical in certain basement regions where the water table is situated at depths of beyond 100 m. Recourse is then had to the system of submerged pumps using solar panels of alternatively electric generator sets.

Another problem lies in the fact that the maximum delivery that these hand pumps can pump decreases greatly with depth. Most of these pumps have a mean hourly flow rate of 750 litres making access to drinking water in villages difficult. This leads to long queues. Hence, these pumping systems are not readily applicable to most developing countries especially when the issue is one of irrigation or effective distribution of drinking water.

SUMMARY

The present invention, defined by the accompanying claims, aims to solve at least one of the aforementioned problems and relates to a pump and to a pumping method.

The invention solves the abovementioned problems, particularly that of the supply of external energy, by using successive depressions or expansions, hereinafter known as "autonomous serial depressions", so that any liquid in contact with the system can be pumped theoretically autonomously—and therefore practically with a reduced energy consumption. In practice, this pumping therefore takes place with a very limited addition of energy, particularly for priming.

In fact, the system has no submerged pump or mechanical piston and requires a very limited supply of external energy in order to be able to operate continuously, this supply being required mainly for priming the pump.

In addition, the wear of a pump according to the invention is very limited because there are practically no moving parts inside the pump.

Further, a pump according to the invention can be used to pump liquids, particularly water, situated at depths in excess of 100 m.

BRIEF DESCRIPTION OF THE DRAWINGS

Sheet 1/11

This sheet contains FIGS. 1 and 2.

Sheet 2/11

Sheet 3/11

Sheet 4/11

Sheet 5/11

Sheet 6/11

Sheet 7/11

Sheet 8/11

Sheet 9/11

Sheet 10/11

Sheet 11/11

DETAILED DESCRIPTION

Autonomous Serial Depressions

The principle of serial depression is based on the fact that a gas contained in a non-isolated closed system can receive work from the external surroundings or supply work to the external surroundings. A non-isolated closed thermodynamic system is a system which does not exchange material with the external surroundings but may exchange all kinds of energy with the external surroundings (for example heat, mechanical force, displacement etc.).

The present invention therefore exploits the situation whereby it is the closed system which supplies work to the external surroundings. Here we are dealing mainly with compressible fluids.

Let us consider the case of a compressible fluid, for example air, contained in a tube that is isolated from the external surroundings by a plug of negligible weight which is able to slide without any friction along the wall of the tube. If the pressure in the external surroundings is reduced to below the pressure obtaining inside the system, the plug will move under the effect of the expanding of the compressible fluid located inside the system. The system is then said to be supplying work.

Figure 1:
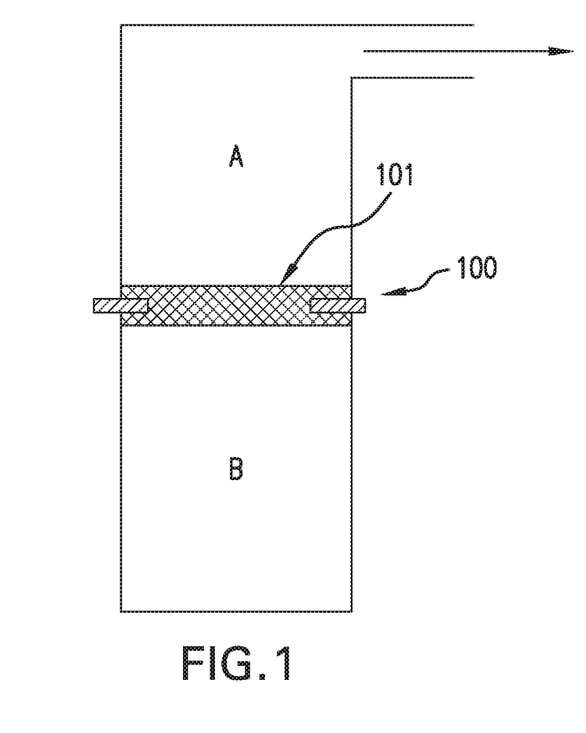
FIG. 1 is a thermodynamic system with two compartments A and B in which there are gases at different pressures. The two compartments are separated by a fixed plug [101] of negligible weight held in position by a pin [100].
Figure 2:
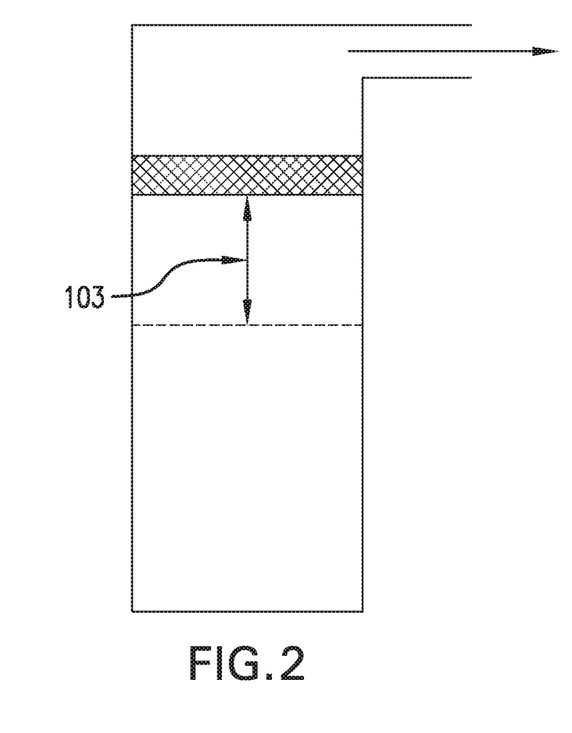
FIG. 2 is the same system with the pins removed. The gas in compartment 2 expands, supplying work capable of moving the plug. At equilibrium, the pressure in the two compartments is the same.

FIG. 1 depicts two chambers separated by an impervious plug of negligible weight. The plug is secured by two pins [100] in order to hold the plug in position against differential pressures. Let V1 and P1 respectively be the volume and the pressure in compartment B and let Pex be the pressure in compartment A such that Pex<<P1. When the two pins [100] are removed, the plug [101] is pushed upwards because of the expanding of gas as shown in FIG. 2. This is the result of the work of the gas contained in chamber [B].

The work performed by the system results in an increase in volume [103] which corresponds to the equation:

$$w = -P_{ex} dV \qquad \text{(Equation 1)}$$

Where Pex is the pressure obtaining in the external surroundings and dV is the variation in volume [103].

Figure 3:
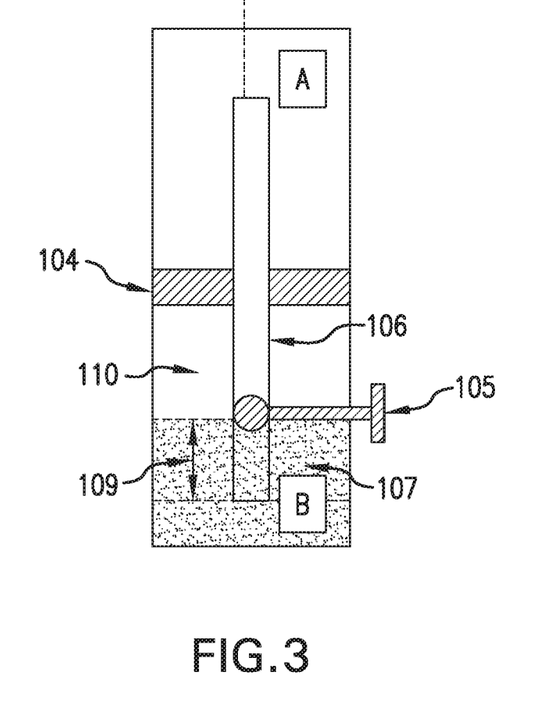
FIGS. 3 and 4 depict a system as described in FIGS. 1 and 2 except that the two compartments are in communication by way of a tube [106] fitted with a valve allowing them to be isolated or placed in communication with one another. Here, the plug is replaced by a liquid capable of rising up the tube [106] according to whether or not the gas in compartment B extends.

Let us reconsider the same experiment but instead of having a plug able to slide without friction under the effect of the expanding or expansion of the gas, we replace this with a plug [104] which is completely fixed to the wall of the tube by welding or bonding. This plug cannot therefore move as the gas expands. Let us now fill compartment B with an incompressible liquid [107]. Let us have a tube [106] pass through the plug [104] between compartments A and B. This tube [106] penetrates by a certain depth so as to avoid any exchange of gas between compartment B and compartment A. This system is therefore a closed non-isolated thermodynamic system in which the floating plug is replaced by an incompressible liquid. The tube [106] which passes through the two compartments is isolated by a valve [105]. When the valve [105] is closed as shown in FIG. 3, the two compartments A and B are thermodynamically closed and isolated.

Figure 4:
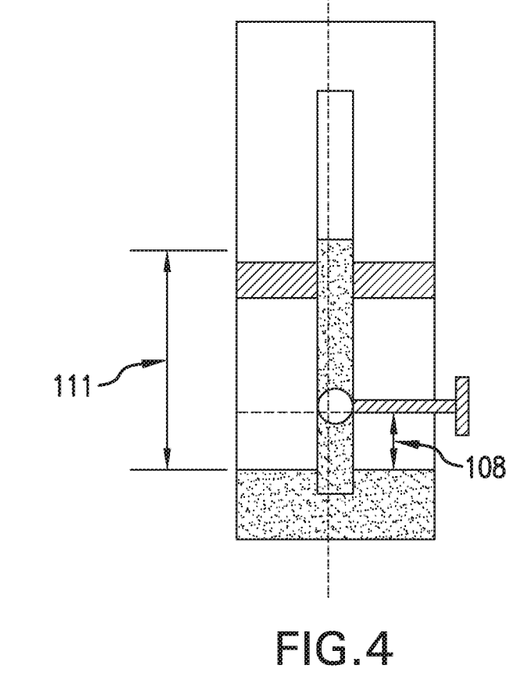

Let us keep the pressure Pex of the gas in compartment A lower than the pressure P1 of the gas [110] obtaining above the liquid in compartment B. If the valve [105] is kept closed, the two compartments are therefore isolated from one another as shown by FIG. 3. Under such conditions, nothing happens in compartment B. If the valve [105] is opened [slowly], because the pressure Pex in compartment A is lower than the pressure of the gas [110] in compartment B, this gas will begin an isothermal expansion which will therefore cause the liquid [107] in compartment B to rise up along the tube [106] as shown in FIG. 4. This rising of liquid is accompanied by an increase in the volume of gas [110] in the compartment. This increase in volume [108] is the result of the work performed by the gas [110] of compartment B. The increase in volume with no exchange of material in compartment B is therefore accompanied by a drop in the pressure P1 of the gas [110].

The total work performed by the gas [110] in its expansion is therefore expressed by the following relationship:

$$w = -Pdv - mgh = -P_{ex} dV \qquad \text{(Equation 2)}$$

Where P is pressure of the gas in compartment B, dv is the variation in the volume [108] of the gas [110] in FIG. 4, m is the mass of the liquid, g is the acceleration due to gravity and h is the height or head [111] of the incompressible liquid [107] in the tube [106]. Pex is the pressure outside the compartment B obtaining in compartment A, dV is the variation in volume [103] in FIG. 2.

The condition for the liquid [107] to completely fill the tube [106] is that the work supplied by the expanding or expansion of the gas [110] be sufficient to provide the required work, which is connected directly to the magnitude of the pressure Pex in compartment A. In the experimental device of FIG. 3 and FIG. 4 the work that has to be supplied for the liquid [107] to completely fill the length of the tube [106] is described by the formula below which has been devised taking experimental factors into consideration:

$$W = -\frac{P_1 V_1}{(V_1 + V_t)} I^{-\frac{\rho g V_t^2 \sin\alpha}{RT V_{tsp}}} \int\int\int dv - \frac{\rho g dv^2}{V_{tsp}} \sin\alpha / \qquad \text{(Equation 3)}$$

P1 and V1 respectively are the pressure and the volume of the gas [110] in the initial state, that is to say prior to the opening of the tap [105]; ρ is the density of the liquid [107]; g is the acceleration due to gravity, R is the universal gas constant; T is the temperature of the gas; Vt is the total volume of the tube [106]; Vtsp is the specific volume of the tube [106]; α is the angle between the system and the horizontal plane.

The pressure of the gas [110] in compartment B when the work performed is great enough for the liquid [107] to rise the full height of the tube [106] is expressed by the equation described by Equation 4. This pressure is known as the critical pressure, Pc, above which the liquid [107] will overspill from the tube into compartment A. It is expressed by the following expression:

$$Pc = \frac{P_1 V_1}{V_1 + V_t} l^{-\frac{\rho g V_t^2 \sin\alpha}{RT V_{tsp}}} \quad \text{(Equation 4)}$$

The total work supplied by the isothermal expansion of the gas [110] therefore can be expressed by the relationship below, which is the solution of Equation 3:

$$W = -\frac{P_1 V_1}{(V_1 + V_t)} l^{\left(-\frac{\rho g V_t^2 \sin\alpha}{RT V_{tsp}} + ln V_t\right)} - \frac{\rho g V_t^2}{V_{tsp}} \sin\alpha \quad \text{(Equation 5)}$$

Figure 5:
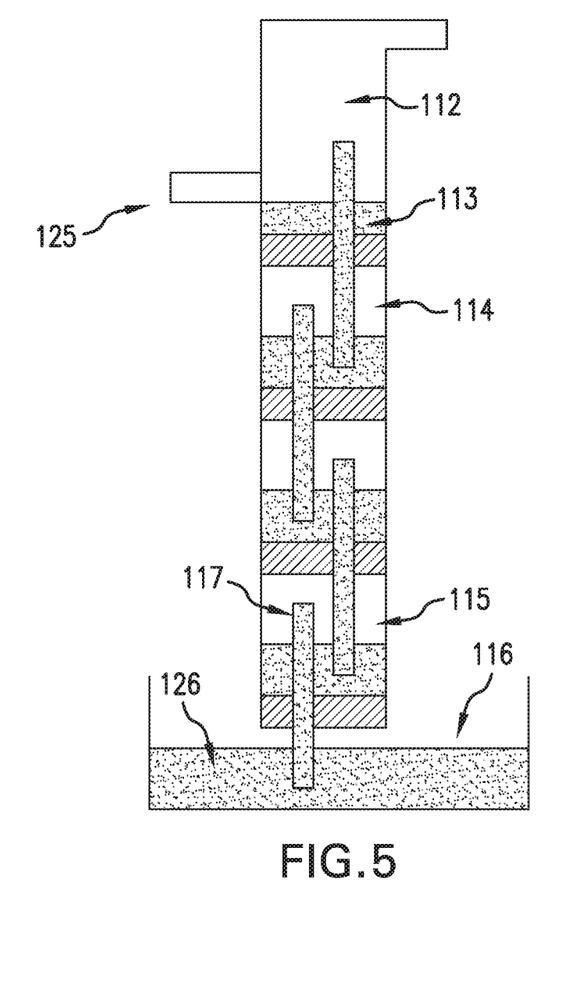
FIG. 5 depicts the serial depression or compression pump consisting of a series stack of devices as described in sheet 2/10.
Figure 6:
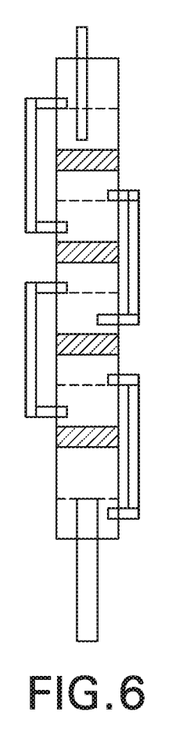
FIG. 6 shows another way of arranging the tubes to allow the thermodynamic compartments to communicate with one another.

The reduction of the pressure of the gas [110] in compartment B as a result of the expanding thereof can be exploited by way of external pressure by another non-isolated closed system similar to the system of FIGS. 3 and 4. This amounts to arranging these simple devices of the model to be studied in FIGS. 3 and 4 in series by stacking them one on top of the other as shown by FIG. 5. This device is therefore made up of a series of thermodynamic systems that are closed and isolated in terms of the gas stored above the liquid of each system. The number of moles of these gases remains constant because there is no exchange of material with the other systems. However, from the thermodynamic standpoint, the incompressible liquid behaves as in an open system because there is the possibility of liquid being transferred from one system to another. The expanding of the gas contained in a closed and isolated system will supply the work needed for transporting the liquid contained in an open system from one system to another.

In the device of FIG. 5, if a lower pressure is applied to the gas in the first system [112] this will cause the expanding of the system [114] located below it and this "series or serial expansion or depression" will spread to the last system [115] dependent on the pressure created at the first system [112]. The last system [115] is connected directly by a tube [117] to the external surroundings—external system [116] containing liquid above which there is a pressure P which may in most cases be atmospheric pressure or a different pressure—if this external system is likewise closed to the atmosphere. This pressure P is more or less equal to the initial pressures of the gases of each system of the device of FIG. 5. If the pressure applied to the first system [112] is sufficient to cause the gas contained in the last system [115] to expand. This expanding will in turn cause a reduction in pressure in the system [115]. That will create a pressure differential between the ambient pressure of the external system [115] the consequence of which will be that the liquid contained in the system [115] will rise up inside the tube [117]. The arrival of liquid in the system [112] will increase the pressure of the gas in this system and this will cause a further rising of the liquid in system [112] towards the system situated above. This rise will continue sequentially—the term employed is "serial flow" until the liquid reaches the first system and becomes deposited [113] there. If the pressure in the first system is kept constant, this serial depression followed by the serial flow will continue for a significant length of time limited only by imperfections in the system (heating, vaporization, formation of bubbles, etc.).

When the depression created in the first system [112] is great enough that the pressure in the last system [115] is equal to the critical pressure, the pressure Pi of the gas contained in each system i can be described or evaluated using the following equation:

$$\begin{cases} Pi = \frac{P_1 V_1}{(V_1 + dv)} l^{-\frac{\rho g dv^2 \sin\alpha}{P_1 V_1 V_{tsp}}} \Rightarrow dv \leq vt & \text{(Equation 6)} \\ Pi = \frac{P_1 V_1}{(V_1 + dv)} l^{-\frac{\rho g (ht^2 - himt^2) * V_{tsp} \sin\alpha}{P_1 V_1}} \Rightarrow dv > vt & \text{(Equation 7)} \end{cases}$$

Where dv is the variation in the volume of the air [110] during the expanding, vt is the volume of the tube and himt is the variation in the depth of water [109] during depression.

Equations 6 and 7 are physical models of the change in pressure of the air during the expanding. The variation in pressure when dv is less than or equal to the volume of the tube is described by Equation 6 and when the volume dv is greater than the volume of the tube, that is to say when the liquid overspills from the tube and falls into the compartment above, the pressure of the air [110] is described by Equation 7.

When the depression applied exceeds the physical length, the difference in pressure between the discharge and suction sides tends towards zero. The system behaves as if there was no hydrostatic pressure head. The apparent length of the system becomes shorter than the physical length of the device.

Hence, knowing the total number of systems mounted in series, it is possible to calculate the depression PexR that has to be created at the first system [112] in order to be able to achieve the critical pressure Pc in the last system, by applying the following equation:

$$Pex_R = \sum_{i=1}^{n-1} \left( \frac{P_1 V_1}{(V_1 + dv_i)} l^{-\frac{\rho g (ht^2 - himt_i^2) * V_{tsp} \sin\alpha}{P_1 V_1}} - \rho g (ht - himt_i) \sin\alpha \right) \quad \text{(Equation 8)}$$

The condition for serial flow to continue as far as the reservoir is dependent on the differential pressure between the pressure above the liquid [116] and the pressure of the gas inside the last system [115]. This differential has to be great enough to cause the liquid [125] to rise the full height of the tube [117] and overspill into the last system [115].

Hence, in order for this system to operate continuously, it is important to note that the pressure of the gas [110] has to be above the boiling pressure. Below this pressure, the dissolved gases will gasify and will make up the pressure difference in the system adjacent to the first system. Gases coming out of the liquid phase will therefore increase the pressure of the gas above the liquid, and this will not allow autonomous serial depression to be activated. The critical pressure Pc and the pressure of the first system Pex absolutely must be above the boiling pressure. In the case of water, the boiling pressure even at 50 degrees Celsius is sufficiently low (0.123 bar) and can be estimated for all temperatures ranging between 5 and 140 degrees Celsius using the following equation:

$$\ln p_{sat} = 13.7 - \frac{5120}{T} \quad \text{(Equation 9)}$$

Where T is the temperature on the Rankine scale and Psat is the saturation pressure in atmospheres.

The device of FIG. 5 is therefore capable of an autonomous serial depression followed by an autonomous serial flow. This operation will be perpetual provided that the external system does not run out of liquid and provided that the depression created in the first system [112] is kept constant. In practical terms, that can be achieved by using a vacuum pump connected to the system [112]; flow will be continuous. Using a vacuum pump means using energy from an external (electrical or mechanical) source.

Figure 7:
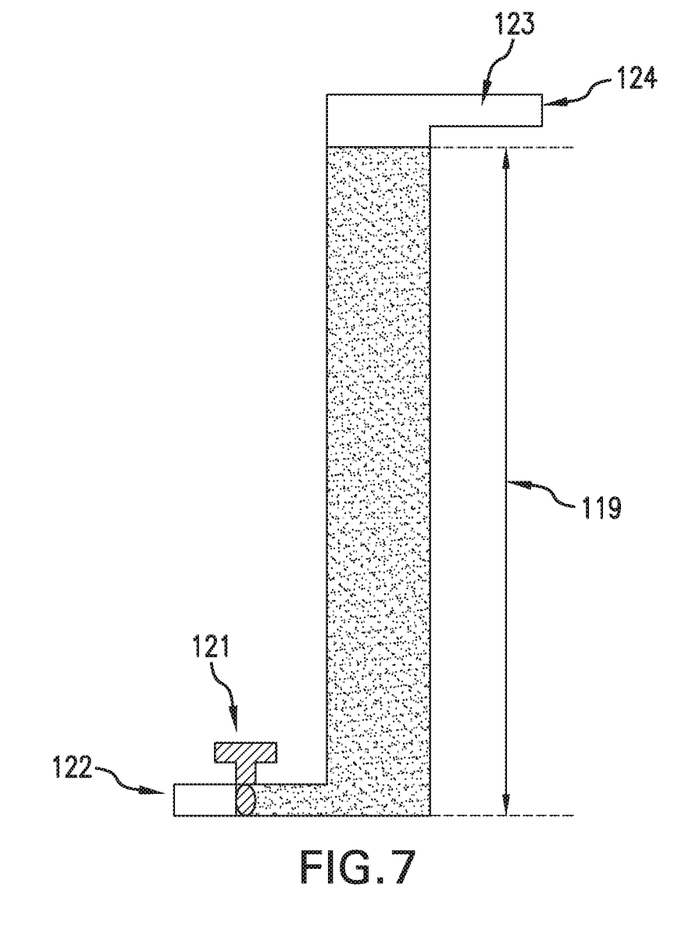
FIG. 7 shows the motive column needed to create the depression that activates the serial depression.
Figure 8:
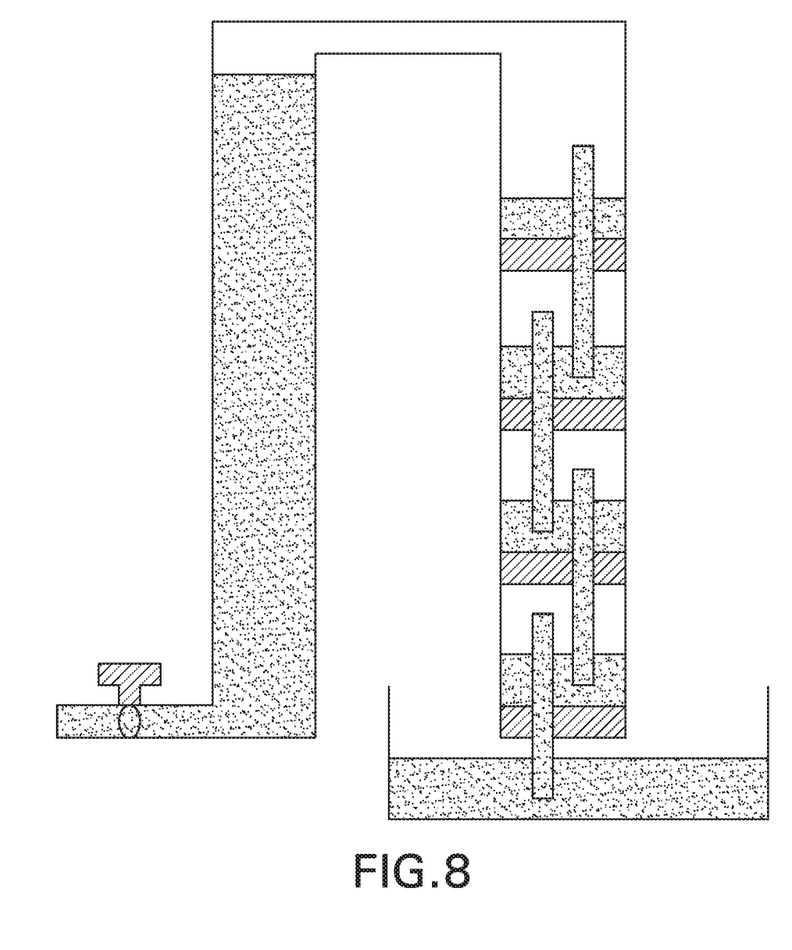
FIG. 8 shows the motive column and the serial depression pump fitted together.

It is one of the well known properties of fluid mechanics which will therefore be used to create the depression needed in the system [112] in order to ensure continuous operation of the system. Let us consider a device like the one described in FIG. 7. It is made up of a pipe filled with liquid up to a height [119]. Above the free surface of the liquid there obtains a normal pressure which may be equal to the ambient pressure of the external surroundings gas. The pipe has a drain orifice [122] closed by a valve [121]. When the valve [121] is open, water flows from the orifice under its self weight. This flow causes an increase in the volume of the gas [123], similar to expanding but expanding forced by the flow of the water. The consequence of this is that it reduces the pressure of the gas [123]. If the extension [124] of FIG. 7 is connected to the first system [112] of FIG. 5 as shown by FIG. 8, the depression of the gas [123] will create a reduction in pressure required at the first system [112] to activate the autonomous serial depression. Further, if this pressure Pex at the system [112] is equal to the pressure described by Equation 8, the autonomous serial depression will be followed by autonomous serial flow.

Flow through the opening [122] will cease at a minimal head or height described by the following equation:

$$H_{min} = \frac{p_{atm} - p_{ex}}{\rho g} \quad \text{(Equation 10)}$$

Where Patm is the external pressure corresponding to atmospheric pressure in a system open to the atmosphere. If the connecting of the extension [124] is performed at the base [125] of the system [112], the serial flow will increase the level of the liquid which will therefore flow through the extension [124] of the motive column of FIG. 7.

The height of this motive column needs to be fairly tall so that when the level of the liquid reaches the minimum height or head Hmin at which flow at the tap [122] ceases, the gas pressure Pex is equal to the pressure PexR needed to activate autonomous serial depression and autonomous serial flow.

Autonomous Serial Compression

Also, the same system as described above using the principle of autonomous serial depression can be used by creating an autonomous serial compression. In order to achieve that, all that is required is for the pump to be immersed by a sufficient depth to cause compression of the gas contained above the liquid. The key objective is to create a compression so that there is a pressure differential with respect to the external or ambient pressure. At the same time as compression is taking place and because the liquid is open to the system located above it at a lower pressure, the gas being compressed will supply work which will cause the liquid in the system to rise into the compartment above. The gas is compressed by the ingress of liquid via its submerged part. The ingress of the liquid into the system therefore reduces the volume of the air. Hence increasing its pressure.

The compression pressure is equal to the hydrostatic pressure or head of liquid in which the pump is immersed.

In the autonomous serial compression system there is no need for a motive column. The pressure differential between the system and the external surroundings is therefore enough to allow serial flow when the depth of immersion is sufficient to activate the serial compression.

Fields of Application

Bore-Holes and Water Wells

Figure 9:
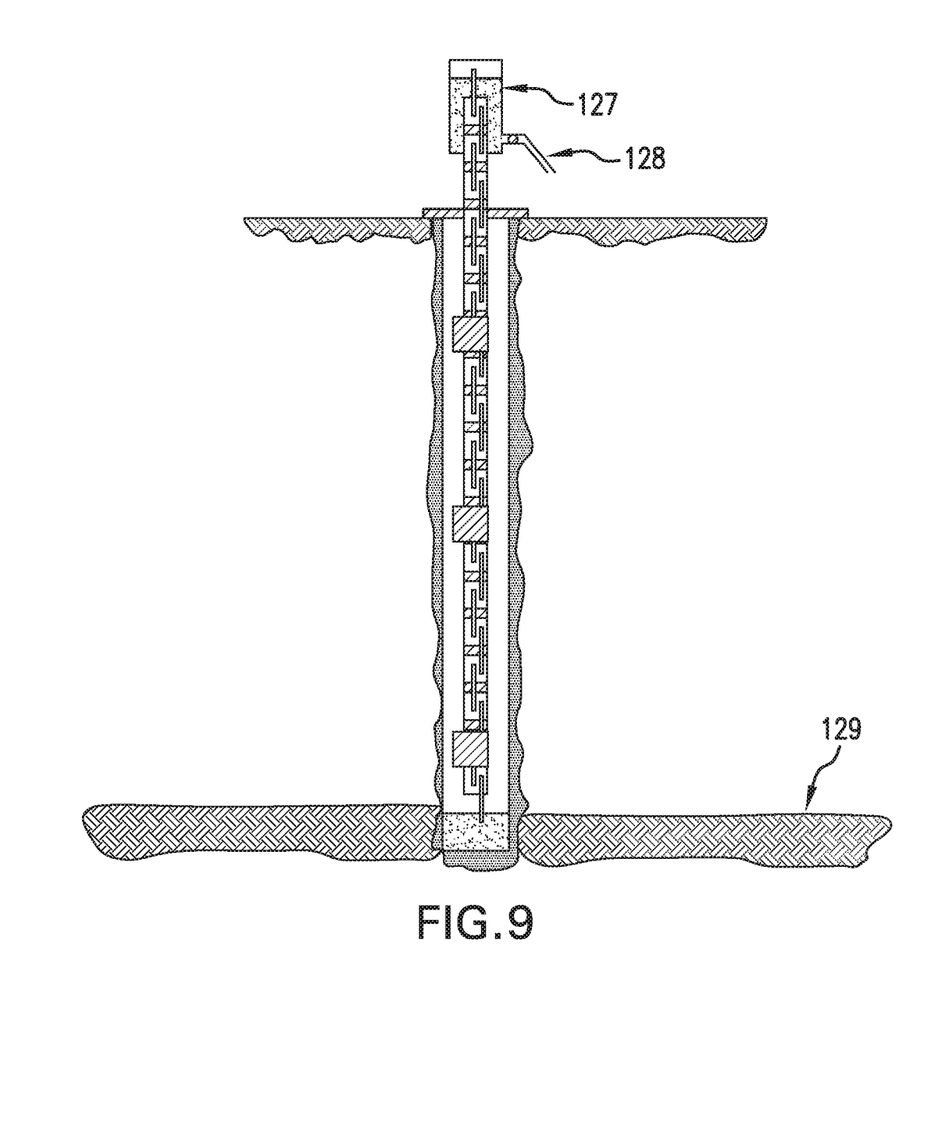
FIG. 9 shows the configuration allowing any fluid to be pumped from a well.

This invention can be applied in the field of water. It can replace all extraction systems used today for the production of water. The depth that the system can reach is beyond several hundred metres. A simplification of this application is depicted in FIG. 9. The motive column corresponds to the well head. The head height of this motive column must be designed to satisfy the condition needed for initiating the depression and the serial flow when the tap [128] is opened. If the capacity of the aquifer [129] to produce water is great enough, the head height of the well head [127] can be increased in order to have a sufficient pressure head. The tap [128] may be replaced by a series of hydrants so that a great many individuals can be served simultaneously. The design of this pump needs to take account of the maximum rate at which the aquifer [129] can deliver so as to avoid the bore-hole or well running dry. The delivery of the pump must therefore be below the maximum rate at which water flows into the well or bore-hole. With this pump, a tower standing a height H above the ground can be filled directly. All that is required is for the pump to emerge from the well to a height that allows the tap [128] to empty its water directly into the tower. Apart from the desire to create a reserve of water, this pump can operate without a tower. It can feed directly into water distribution mains networks for a village or a town. The limiting factor will be the rate of influx of water into the aquifer.

Production of Electricity

Figure 10:
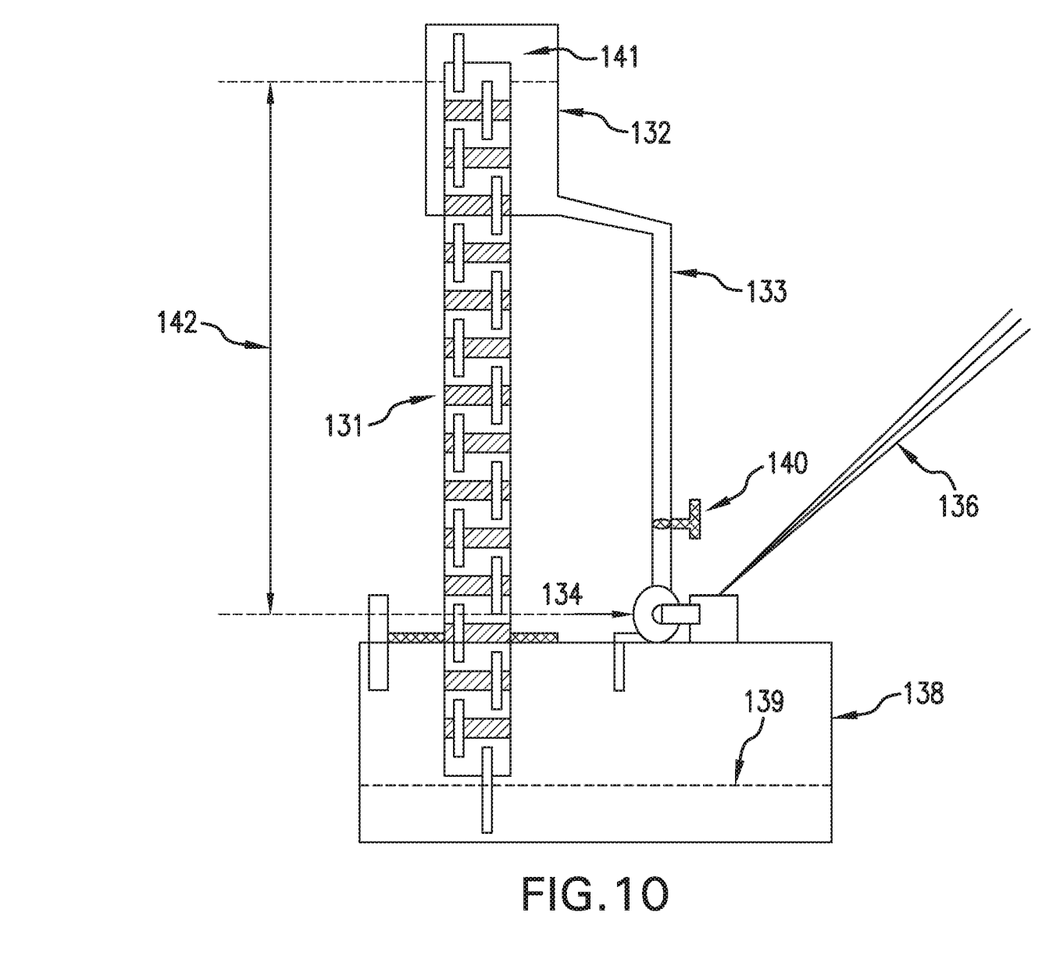
FIG. 10 describes a system enabling electrical energy to be produced theoretically autonomously and, in practice, autonomously for a significant length of time. It comprises a reservoir, the autonomous pump, a turbine, an alternator and a collecting pipe.

This pump is therefore able to create a hydroelectric energy production system in the form of a loop as shown by FIG. 10. This device is made up of a reservoir [138] containing water [139]. The autonomous serial depression pump [131] is installed therein and covered at its apex by a motive column [132] containing water. The motive column is connected to the reservoir by a collecting pipe [133]. Connected to the end of this collector is a turbine [134] which in turn is connected to an electric alternator. Electrical cables [136] are connected to the alternator. When the valve [140] is opened, the water from the motive column [132] flows into the collecting pipe [133] and turns the turbine which then drives the alternator to produce electricity. The reduction in the amount of water in the motive column causes an extension of the gas [141] above the water. This extension therefore creates a depression which activates the phenomena of depression and serial flow through the pump [131]. This pump draws water from the reservoir [138] and delivers it to the motive column.

Figure 11:
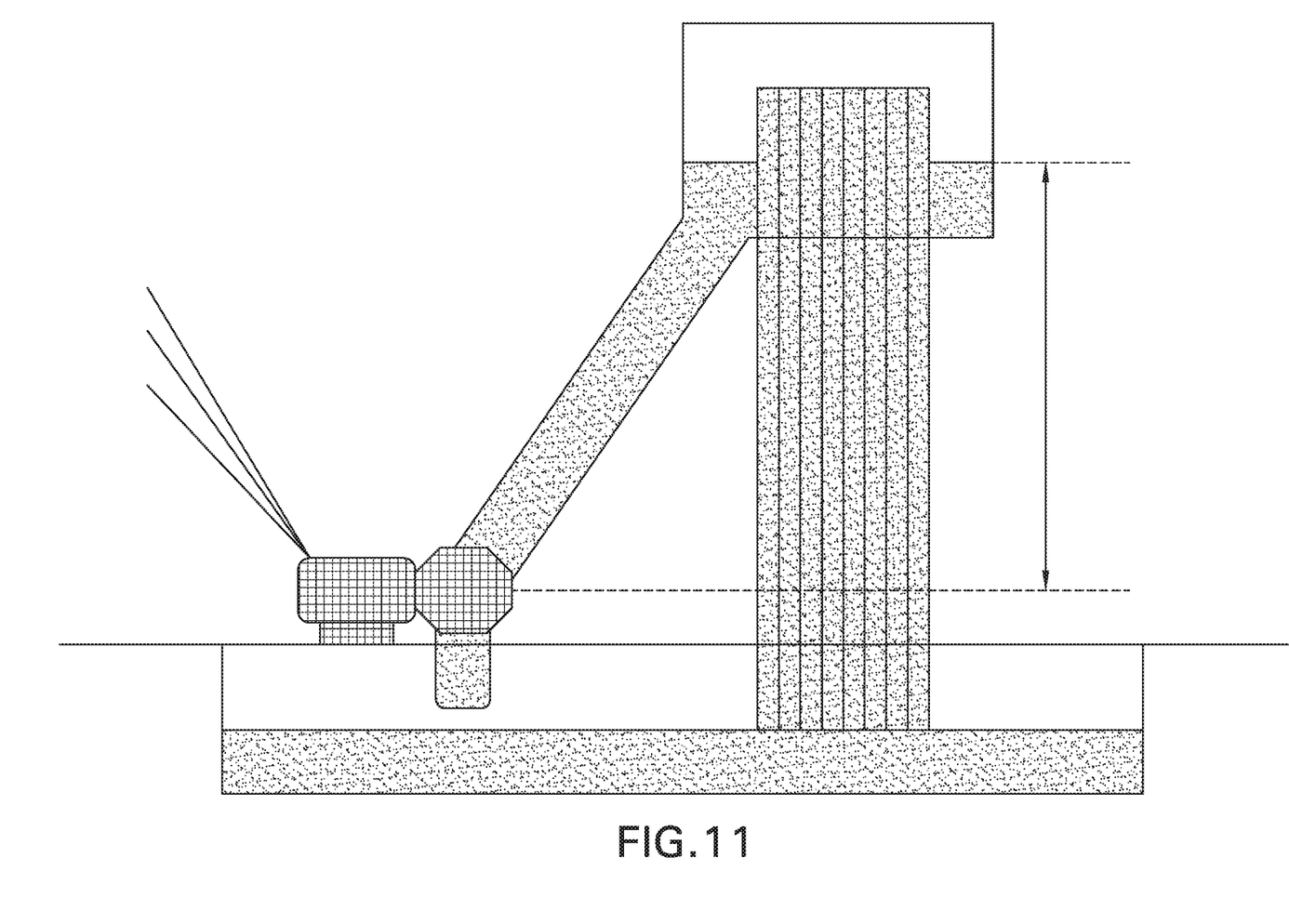
FIG. 11 describes an energy production station for producing electrical energy theoretically autonomously and, in practice, autonomously for a significant length of time, with a combination of several autonomous pumps placed in parallel.

The electrical power generated by such a system is described by the following relationships:

$$Pkw = \rho Q h g \quad \text{(Equation 13)}$$

$$h = H - \frac{Patm - Pex}{\rho g} \quad \text{(Equation 14)}$$

Where Q is the flow rate, h is the effective head height of the drop and H is the head height [142] of the water in the motive column with respect to the shaft of the turbine [134]. This type of power station can be built on any scale from a small scale (sufficient to power a dwelling) to a large scale (sufficient to power a town). According to Equation 13, the electrical power is dependent on the head height h of the drop and on the flow rate Q. These two parameters will be under the control of the designer so it will be possible to construct a system capable of generating possible amounts of power by adjusting the flow rate and the head height. To increase the flow rate Q it is possible to consider a design that uses several autonomous serial depression pumps in parallel as shown by FIG. 11. In such an instance, Equation 13 becomes:

$$Pkw = \rho g h \Sigma_{j=1}^{k} Q_j \quad \text{(Equation 15)}$$

Where k is the number of serial pumps placed in parallel and Qj is the flow rate of each pump.

Liquid Transport Pipeline

Figure 12:
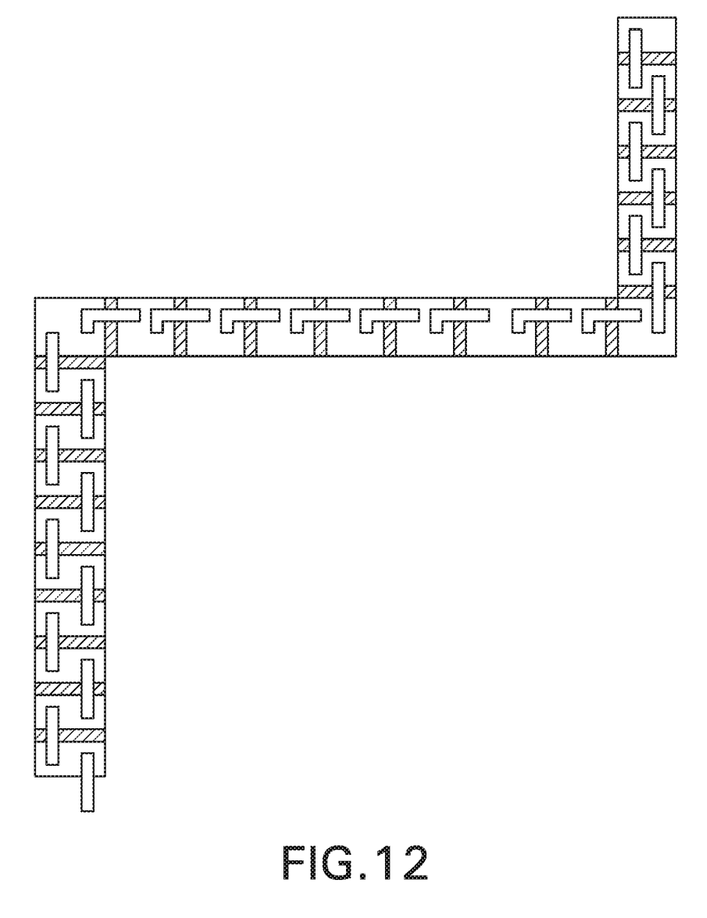
FIG. 12 shows a horizontal configuration for transporting liquid over the surface.
Figure 13:
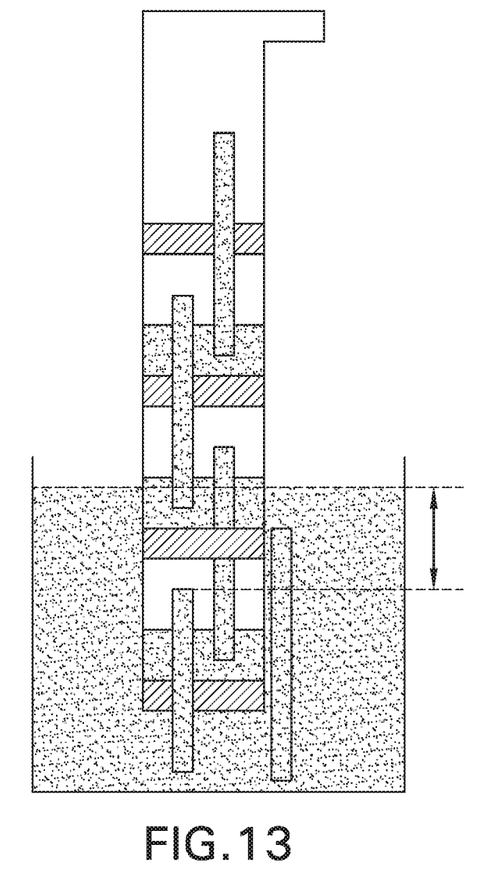
FIG. 13 shows a pump using autonomous serial compression.
Figure 14:
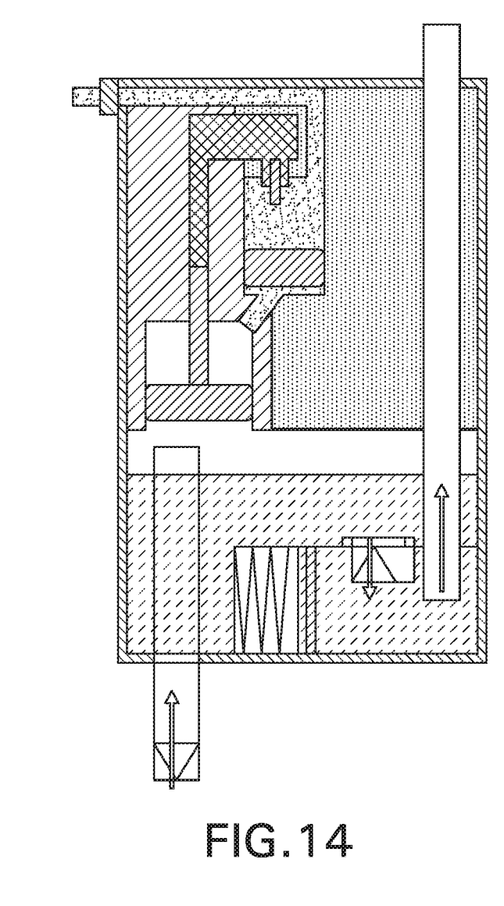
FIG. 14 shows a differential compensator allowing the depression at the surface to be imparted to sections situated at depth.
Figure 15:
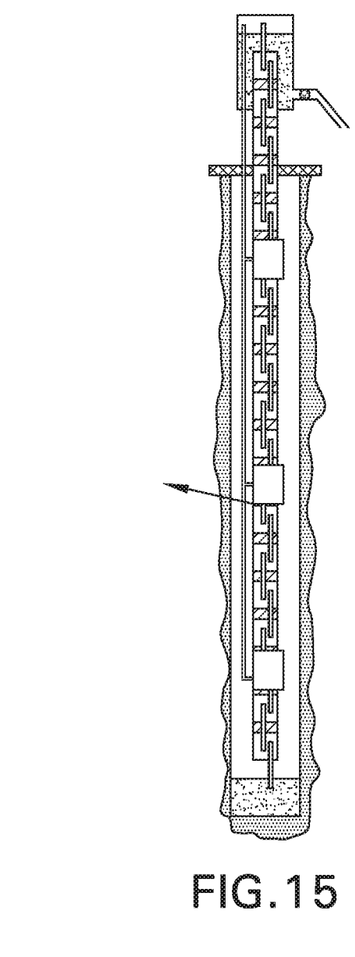
FIG. 15 shows the configuration of the pump with inbuilt differential compensators.

In the equation describing the depression in each system (Equation 6), note the significance of the influence that the inclination has on pump performance. When the angle tends towards zero, that is to say towards the horizontal plane, the depression in all the thermodynamic systems which make up the pump is the same. This amounts to the fact that this autonomous serial depression can be used to transport liquid over vast distances without supplying external energy. This property will allow the invention to be applied to the irrigation of large areas. The distribution of drinking water in built-up areas and also other liquids not connected with water. Water resource management will thereby be simplified. FIG. 12 shows the configuration for switching from a vertical plane to a horizontal one.

Creation of Civil Engineering Structures

These principles can be used to create autonomous public fountains or civil engineering structures of various kinds.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pump assembly comprising:

a plurality of systems, including a first system and a plurality of second systems, each of the plurality of systems containing an enclosed gas placed in contact with an internal liquid, the enclosed gas being placed at a depressed pressure or at a raised pressure in relation to the pressure of surroundings external to the plurality of systems by variations in level of the liquid; and a plurality of tubes, each of the plurality of tubes extending between adjacent systems of the plurality of systems with a first open end terminating in one of the adjacent systems and a second open end terminating in the other of the adjacent systems, wherein:

the first system is in liquid communication with an external liquid below a ground surface, and is configured and located to create compression of the gas enclosed in the first system relative to the pressure of the surroundings external to the first system;

each of the plurality of second systems is closed and isolated in terms of the enclosed gas in contact with the internal liquid therein; and respective liquid environments of the plurality of systems are connected continuously by the plurality of tubes so that compression of the gas enclosed in the first system leads to successive incidences of increased pressure to the gases contained in the plurality of second systems, thereby delivering work to cause pumping of the external liquid in contact with the internal liquid of the first system through the plurality of second systems.

2. The pump assembly according to claim 1, wherein the systems are arranged in sequence by stacking the systems vertically on top of one another.

3. The pump assembly according to claim 1, wherein the first system is located at a depth below the ground surface that is sufficient to cause compression of the gas enclosed in the first system with respect to the pressure of the surroundings external to the first system.

4. A device for producing electricity, comprising a pump assembly according to claim 1, and a turbine which is configured to be set in motion by the liquid pumped by the pump assembly.

* * * * *